July 24, 1956 J. H. HOLLAND ET AL 2,756,272
TELESCRIBER
Original Filed Sept. 20, 1950 9 Sheets-Sheet 2

INVENTORS
Forrest G. Brown
John H. Holland
BY
Curtis, Morris + Safford
ATTORNEYS

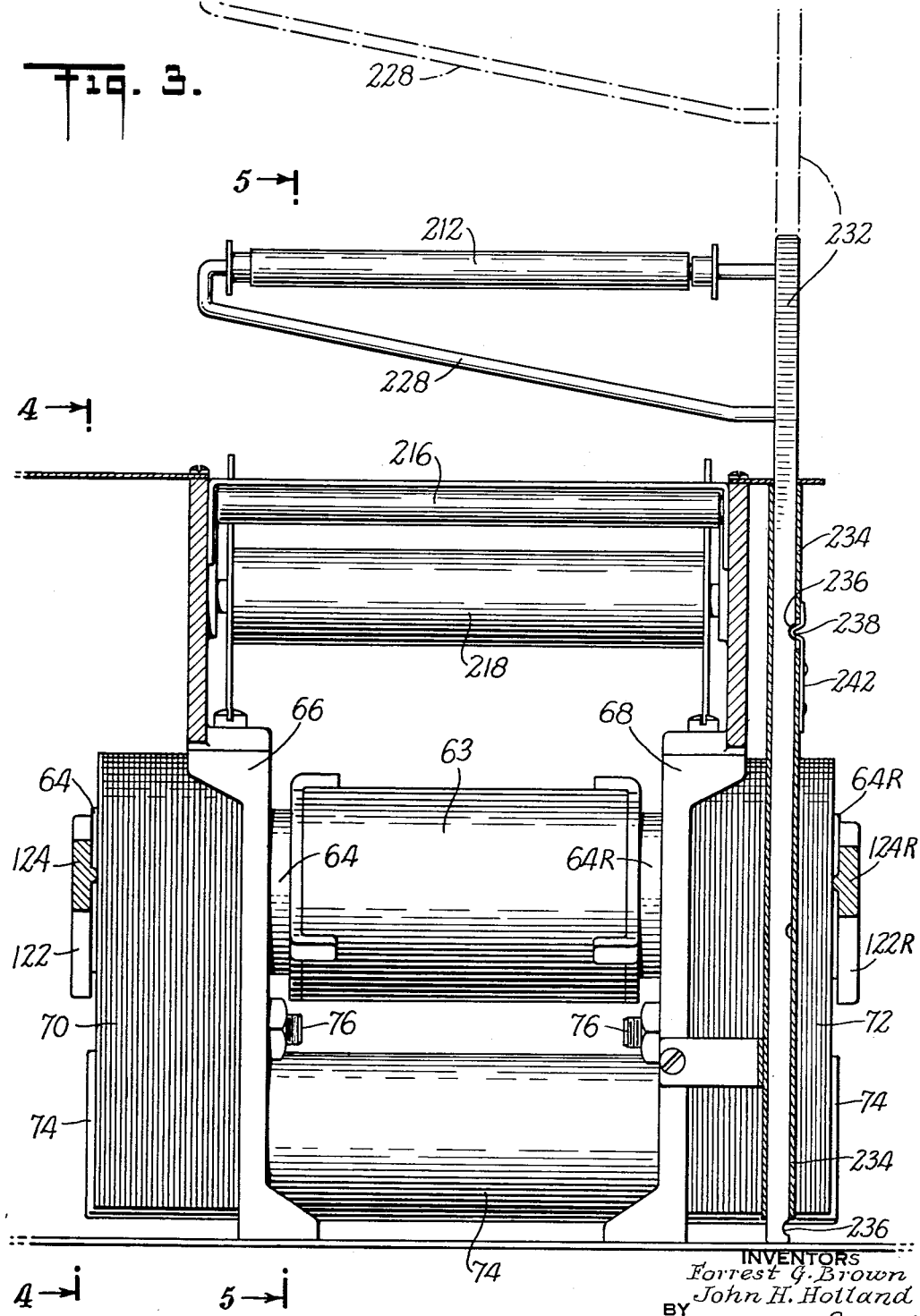

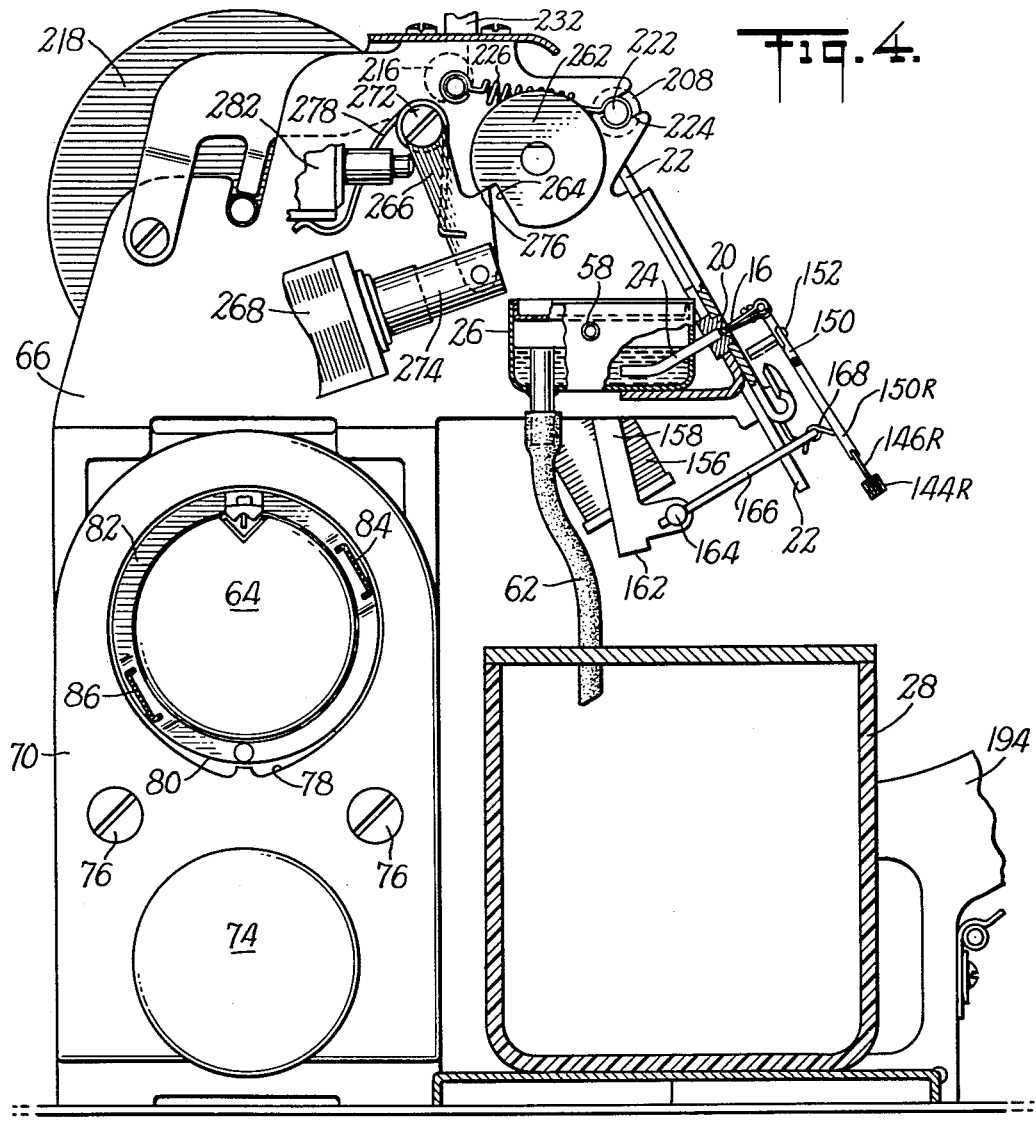

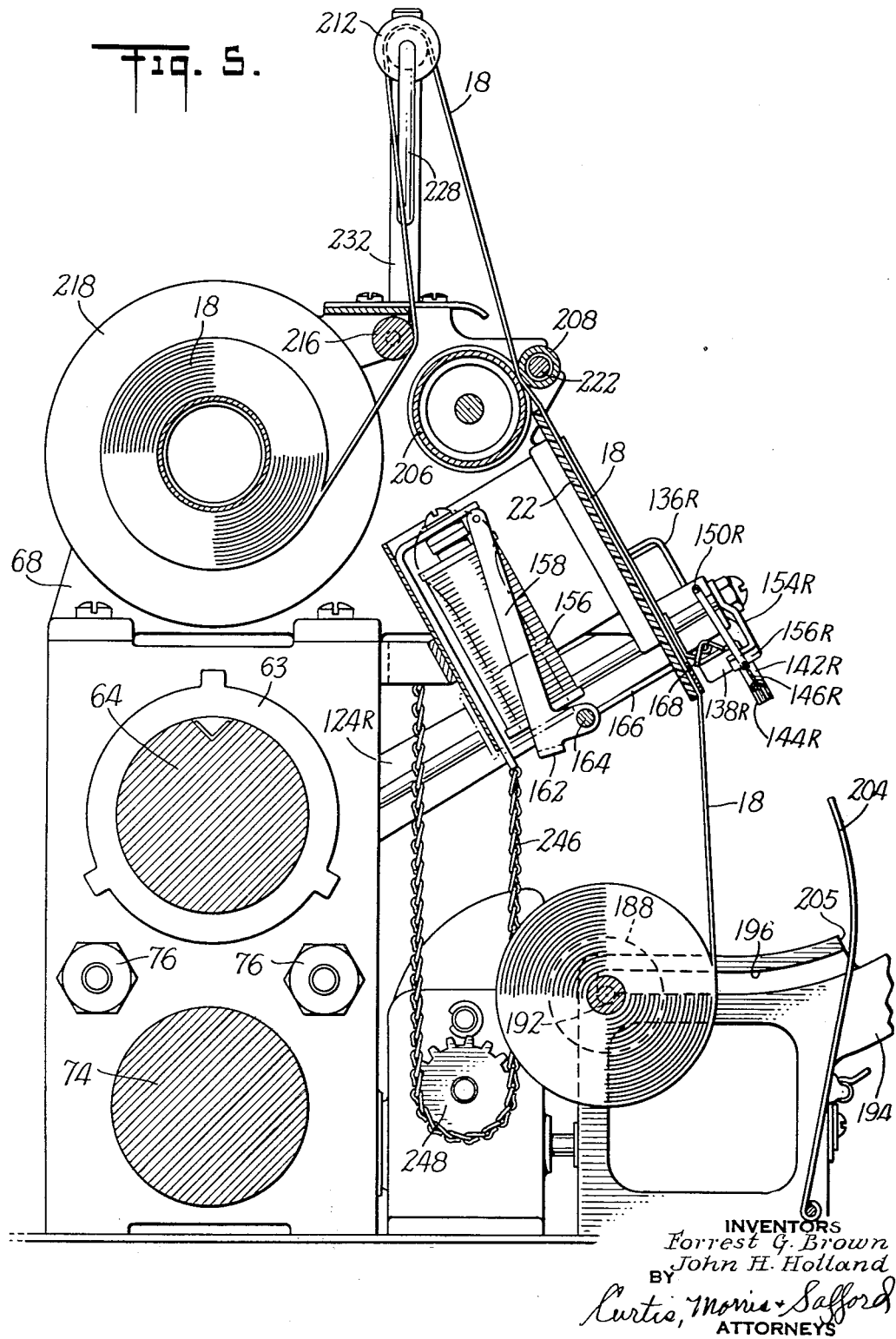

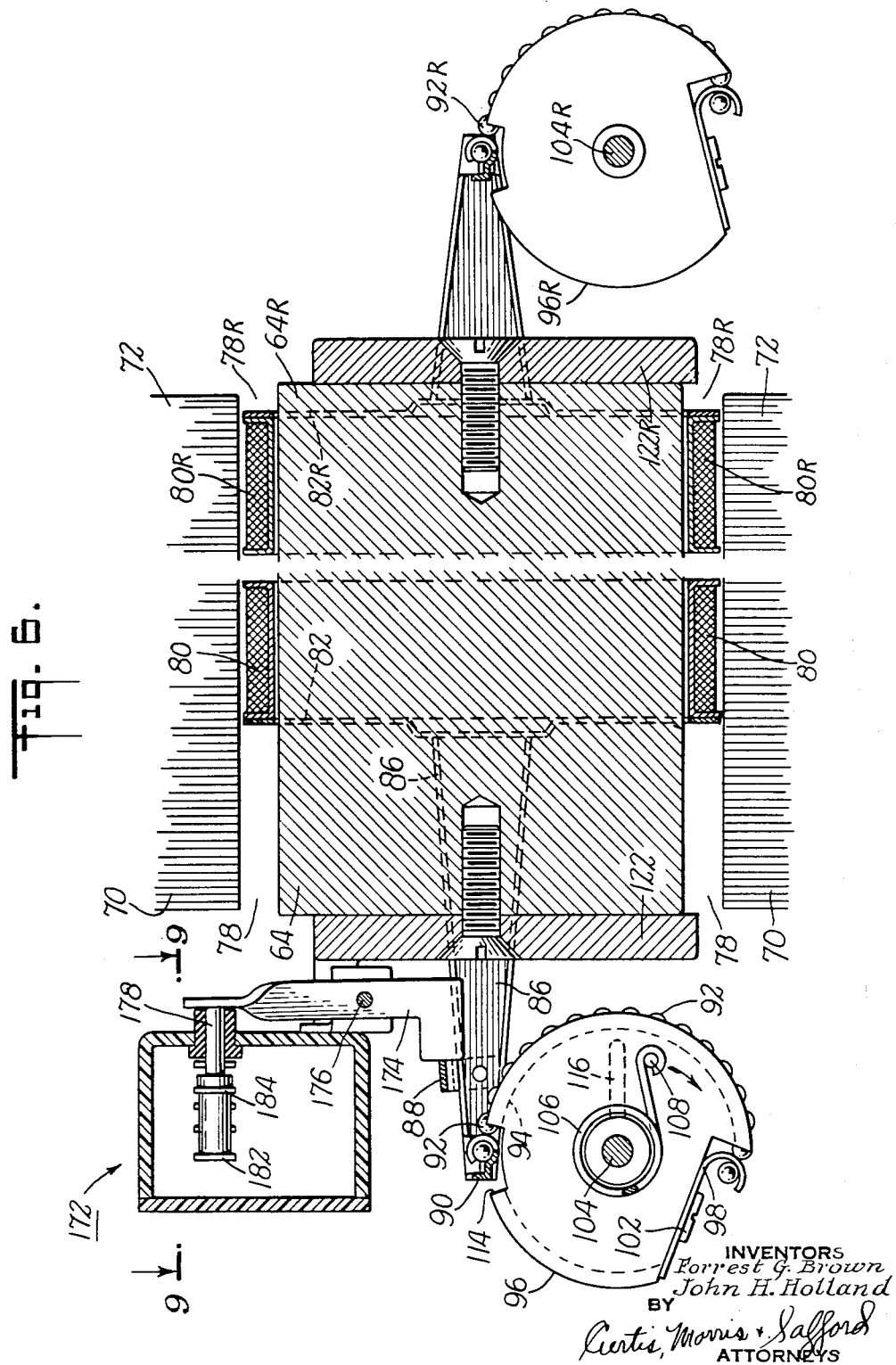

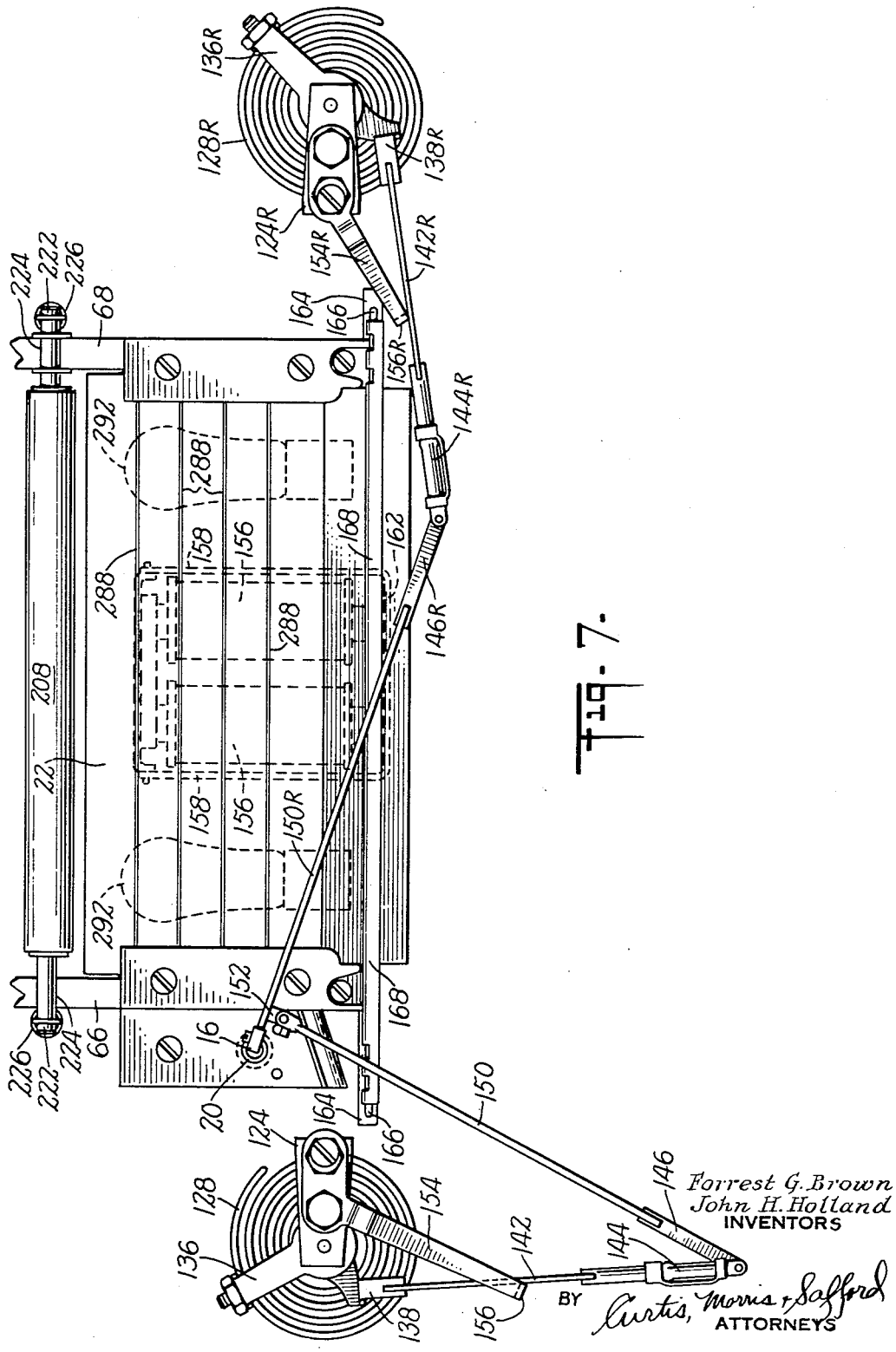

July 24, 1956  J. H. HOLLAND ET AL  2,756,272
TELESCRIBER
Original Filed Sept. 20, 1950                    9 Sheets-Sheet 8
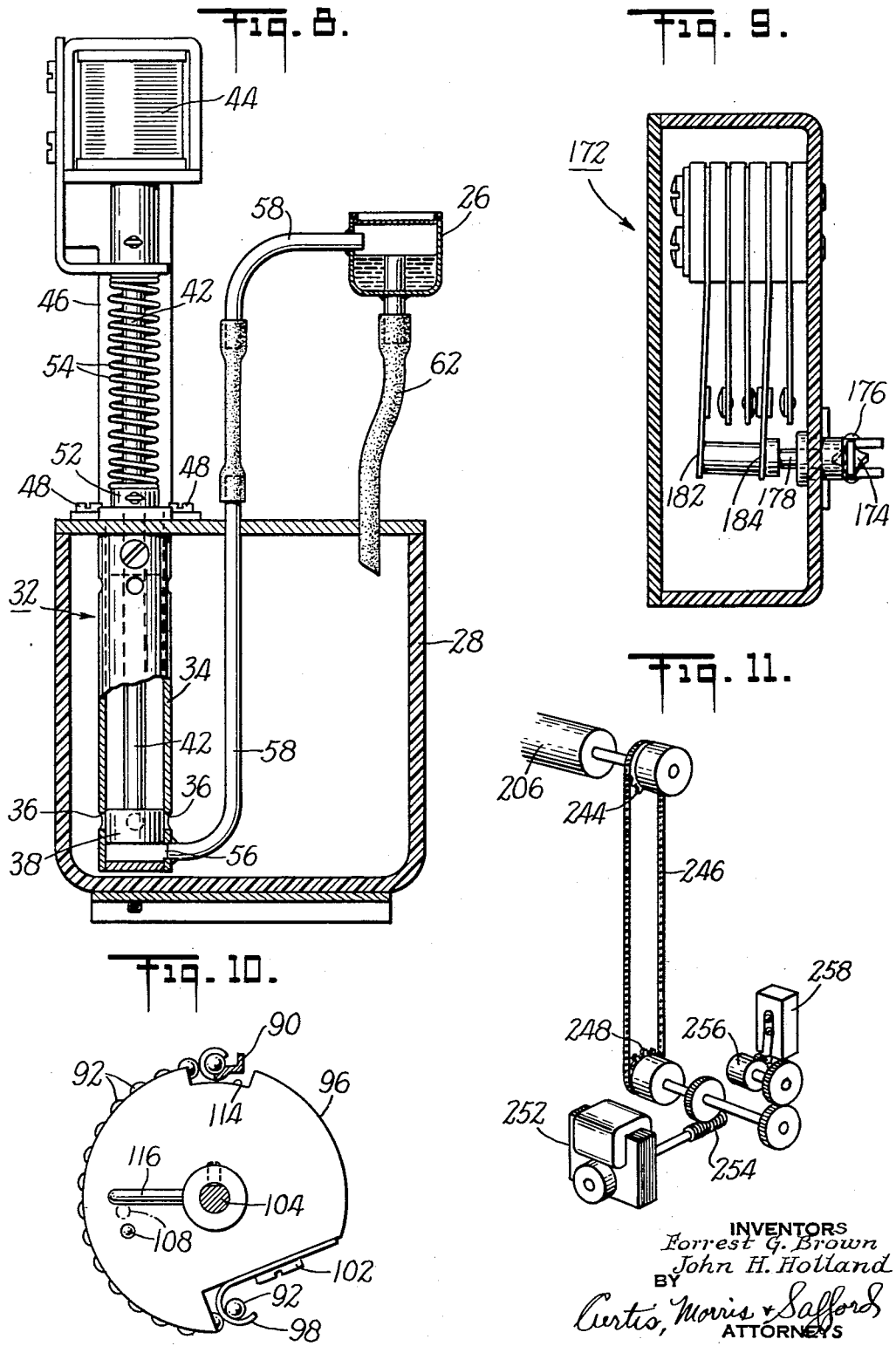
INVENTORS
*Forrest G. Brown*
*John H. Holland*
BY
*Curtis, Morris & Safford*
ATTORNEYS INVENTORS
Forrest G. Brown
John H. Holland
BY
Curtis, Morris & Safford
ATTORNEYS 2,756,272
Patented July 24, 1956

2,756,272
TELESCRIBER

John H. Holland, New York, N. Y., and Forrest G. Brown, Tenafly, N. J., assignors to Telautograph Corporation, New York, N. Y.

Original application September 20, 1950, Serial No. 185,872, now Patent No. 2,711,442, dated June 21, 1955. Divided and this application November 13, 1952, Serial No. 330,231

5 Claims. (Cl. 178—19)

This application is a division of application Serial No. 185,872, filed September 20, 1950, now Patent 2,711,442 dated June 21, 1955.

This invention relates to telescribers for the transmission of graphic characters from one location to another. More particularly, the invention is directed to improving the fidelity of reproduction, and to the simplification and improvement of the telescriber structure.

In telescriber systems of this type, two writing signals are transmitted corresponding, respectively, to two coordinates defining the position of the writing stylus in a plane parallel to the writing surface. A third "on-off" signal is transmitted to indicate whether the writing stylus is in contact with or lifted above the writing surface, so that discontinuous traces can be transmitted. To additional signals also are provided, one for shifting the paper at the receiver and another for controlling a signal buzzer. In the present system, an automatic switch is provided at the receiver which permits the transmission lines connecting the transmitter and receiver to be used for signaling, paper-shifting, or other functions when writing signals are not being transmitted, but switches the circuits for the reception of writing signals whenever such signals are present on the incoming lines.

The present arrangement also includes a platen having illuminated guide lines, or other indicia, so that when the operator is sending a message, the illuminated guide lines of the local receiver, which under these circumstances serve as a monitor, can be used to direct the movements of the transmitting stylus. This is made possible by the use of a thin resilient translucent platen having an opaque surface with the guide lines engraved thereon. The guide lines are adjacent the back surface of the paper strip on which the message is being recorded, thus, eliminating parallax without requiring a parallel-beam light transmission system, and the resiliency of the thin plastic platen absorbs the energy from the pen as it drops on the surface of the paper, thus preventing the pen from bouncing or skipping and causing an incorrect or incomplete trace.

Other aspects, objects, and advantages of the invention, for example, relating to the paper handling apparatus, will be in part pointed out in, and in part apparent from, the following description of a telescriber transceiver embodying the invention considered in connection with the accompanying drawings, in which:

Figure 3 is a sectional view taken along line 3—3 of Figure 2;

Figure 4 is a sectional view taken along line 4—4 of Figure 3;

Figure 5 is a sectional view taken along line 5—5 of Figure 3;

Figure 6 is an enlarged sectional view, with the center portion deleted, taken along line 6—6 of Figure 2;

Figure 7 is an enlarged sectional view taken along line 7—7 of Figure 6; and

Figure 8 is a schematic diagram of the electric circuits of the transceiver shown in the above drawings.

Figure 1:
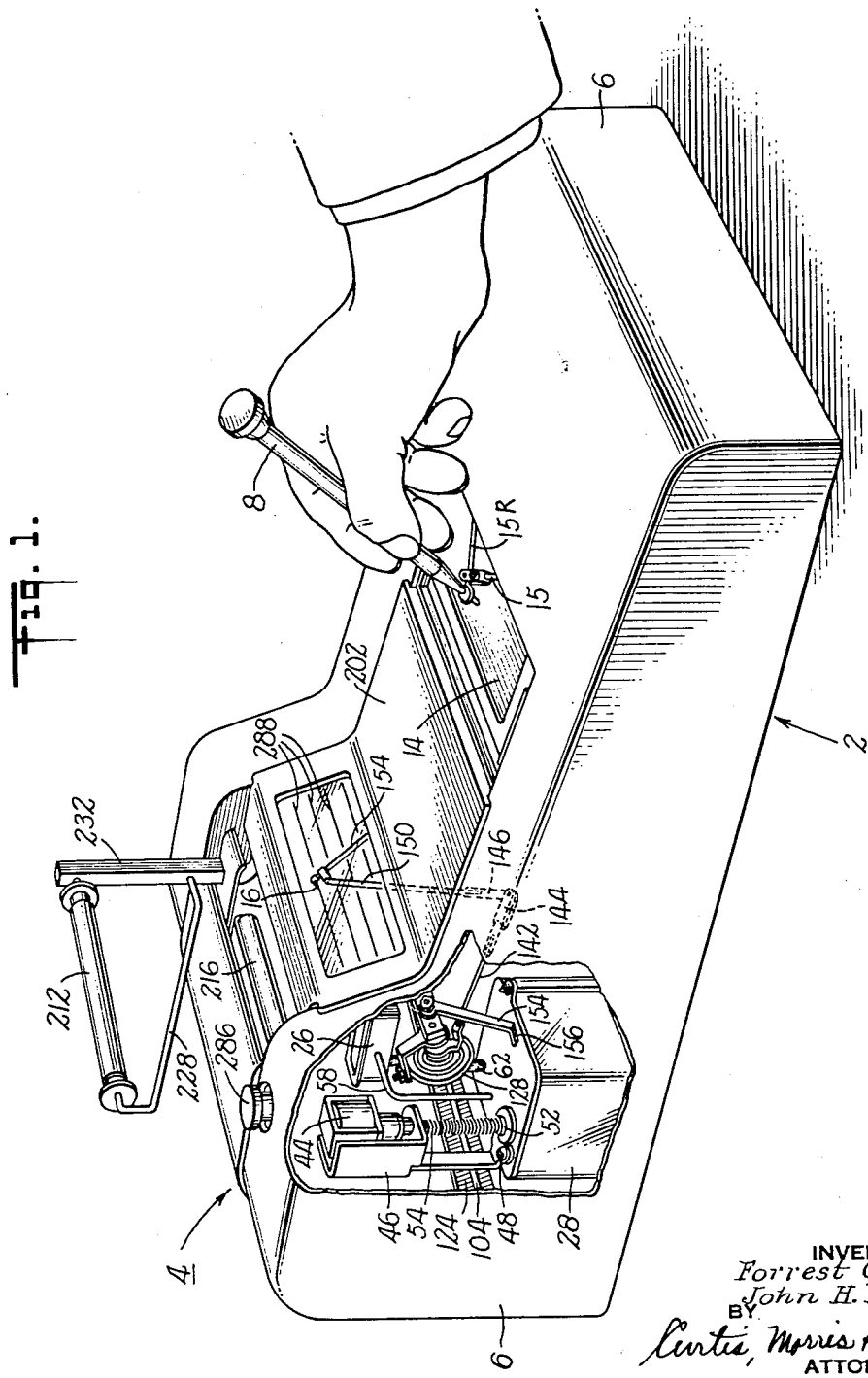
Figure 1 is a perspective view of a telescriber transceiver for the transmission and reception of graphic characters, part of the case being cut away to show the arrangement of certain parts.

Figure 1 shows a combination transmitter and receiver, called a transceiver, for the transmission of graphical characters from one point to another. The transmitting portion of the transceiver is positioned near the front of the machine in the space, generally indicated at 2, and the receiving apparatus is positioned near the rear of the machine, in the space generally indicated at 4. The entire machine is housed in a case 6 of metal or plastic which is provided with the necessary openings or doors to permit convenient access to the operating parts of the transceiver.

This transceiver can be connected to one or more other transceivers or receivers positioned at distant points. The characters to be transmitted are traced with a stylus 8, which is free to move over the upper surface of a platen 14. The stylus 8 is connected by linkage members 15 and 15R which control the signal generating portion of the transmitter in accordance with the position of the stylus 8 on the platen 14. At a distant receiver, these signals effect the reproduction of the graphic characters traced by the stylus 8. When signals are being transmitted to a distant receiver, the local receiver 4 operates as a monitor so that the operator can see exactly what is being reproduced at the distant receiver. This reproduction is accomplished by a recording pen 16 which reproduces the transmitted characters on a strip of paper 18, which is shown in Figure 5, but which has been omitted from the showing of Figure 1 in order to better illustrate certain parts of the transceiver.

The stylus 8 is connected by the linkage mechanism 15 and 15R to a pair of potentiometers (shown only in the schematic diagram of Figure 12) by means of which two writing-signal voltages are produced in accordance with the position of the stylus 8 on the platen 14. These potentiometers and the stylus linkage mechanism are similar to those described by Tiffany in U. S. Patent 1,770,761. The recording pen 16, at the receiver, is operated by a similar linkage mechanism which will be described later.

Figure 12:
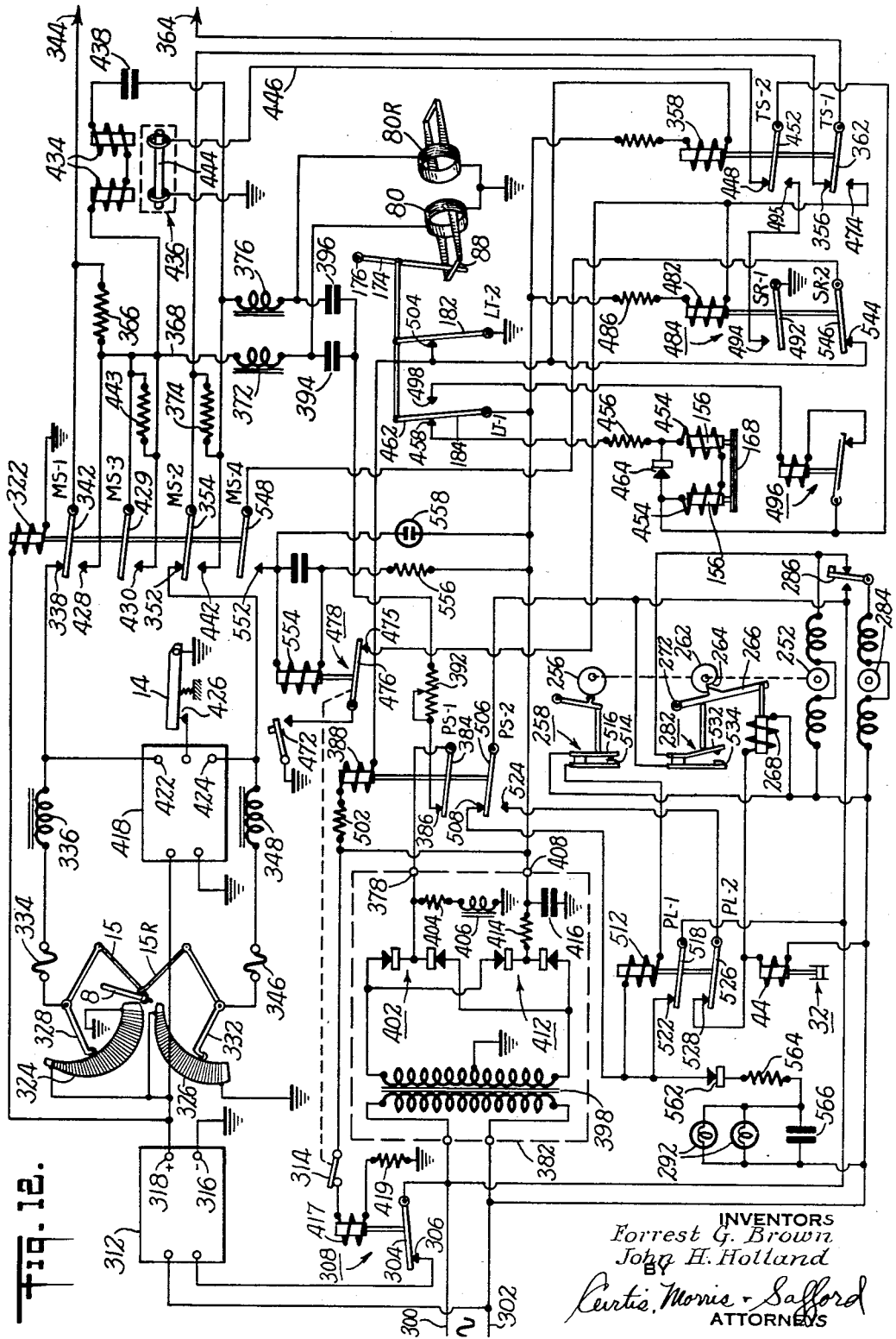

In order to permit transmission of a discontinuous trace, a pressure-operated switch (shown only in diagrammatic form in the electrical circuits of Figure 12) is positioned beneath the platen 14, which is hinged at the forward edge, and arranged so that when the stylus 8 is lifted from the platen 14, the reduced pressure operates the switch to actuate a pen-lifter circuit and lift the recording pen 16 from the surface of the paper 18. This under-platen switch arrangement is similar to that described by Lauder et al. in U. S. Patent 2,355,087.

Pen driving system (Figures 2, 3, 4, 6, and 7)

A moving coil system is utilized to operate the recording pen 16. A steady magnetic field for operation of the moving coils is produced by a permanent bar magnet 63 (Figure 3) which extends cross-wise of the receiver near the rearward portion thereof. This magnet is connected at each end by soft iron pole pieces 64 and 64R supported by two upright frame members 66 and 68, which may be castings of non-magnetic metal. The magnetic circuit is completed through two vertically laminated core members 70 and 72 which surround the ends of pole pieces 64 and 64R and are connected at the bottom by a cylindrical cross bar 74 of soft iron. The core members 70 and 72 are secured to and supported by the frame members 66 and 68 by bolts 76.

An annular space 78 and 78R (Figure 4) is provided between the outer surface of the pole pieces 64 and 64R and each of the laminated core members 70 and 72 along which the pen-operating coils 80 and 80R move; these coils are referred to, respectively, as left and right "buckets."

Because a substantial amount of force is required to operate the recording pen, it is necessary to have a relatively high field strength surrounding the buckets 80 and 80R. It has been customary, therefore, to utilize two bar magnets in the construction of the field-producing system, and a strong permanent magnet to aid the magnet 63 was used in place of the soft iron bar 74.

The present structure is such that the additional magnet can be eliminated, and the soft iron bar 74 can serve as a structural member to brace the frame members 66 and 68. This is accomplished by assembling the soft iron bar 74, the core members 70 and 72, and the magnet 63, which is not magnetized at the time the structure is assembled. After the structure has been assembled, the bar 63, which may be formed for example of Alnico 5 or similar material, is magnetized. This is not difficult to do because the shunt magnetic circuit formed by the core members 70 and 72 and the iron bar 74 has a relatively high reluctance, because of the two series air gaps formed by the annular spaces 78 and 78R between the pole pieces 64 and 64R and the core members 70 and 72, respectively. After the bar 63 is magnetized, it provides adequate field strength so long as the magnetized structure is not taken apart. This construction makes it unnecessary to provide an external casing to support the magnetic structure and permits the soft iron bar 74 to serve also as a structural support.

The current through the left bucket 80 is controlled in accordance with the position of the writing stylus 8 at the transmitter and assumes a position longitudinally along the space 78 in accordance with the magnitude of this current. In order to transmit the movement of the bucket 80 to the recording pen 16, the bucket winding is supported by an annular frame 82 which is connected to a yoke formed of two tapered channel members 84 and 86 (Figures 4 and 6). These channel members are connected to opposite sides of the frame 82 and extend outwardly through the annular opening 78. Beyond the end of the magnet 64, the channel members 84 and 86 are connected by two parallel, spaced, cross-members 88 and 90.

A ball-type chain 92 is secured to the center of cross-member 90 and extends around a peripheral groove 94 (see also Figure 2) in a cam 96 and is secured at its opposite end to a slotted end portion of a member 98 which is fastened in a recess in the cam 96 by a screw 102.

The cam 96 is rotatably mounted on a pen-operating drive shaft 104 and is coupled thereto by a coil spring 106, one end of which is secured to the surface of cam 96 by a forwardly-extending anchor pin 108, the other end of which is secured to a collar 112 that is keyed to the shaft 104. This spring tends to rotate the cam 96 relative to the shaft 104 in the direction indicated by the arrow in Figure 6.

The cross-member 90, at the point where the ball chain 92 is secured to it, rests in a notch 114 in the cam 96. Rotary movement of the cam 96 in the direction of the arrow (Figure 6) is limited when the outer wall of the notch 114 abuts the cross-member 90, the bucket and yoke assembly being in its innermost position. When the bucket 80 is energized with current of the correct polarity, the left bucket assembly moves toward the left as viewed in Figure 6, placing the ball chain 92 under tension and rotating the cam 96 in a direction opposite to that indicated by the arrow, this movement tending to wind up the spring 106. During the initial rotation of cam 96 the pen-operating drive shaft 104 remains stationary until the anchor pin 108 which also extends outwardly from the rear face of the cam 96, strikes an arm 116, which is keyed to and extends radially from the shaft 104. Any further rotation of cam 96 exerts a corresponding rotary force on the shaft 104.

Figure 2:
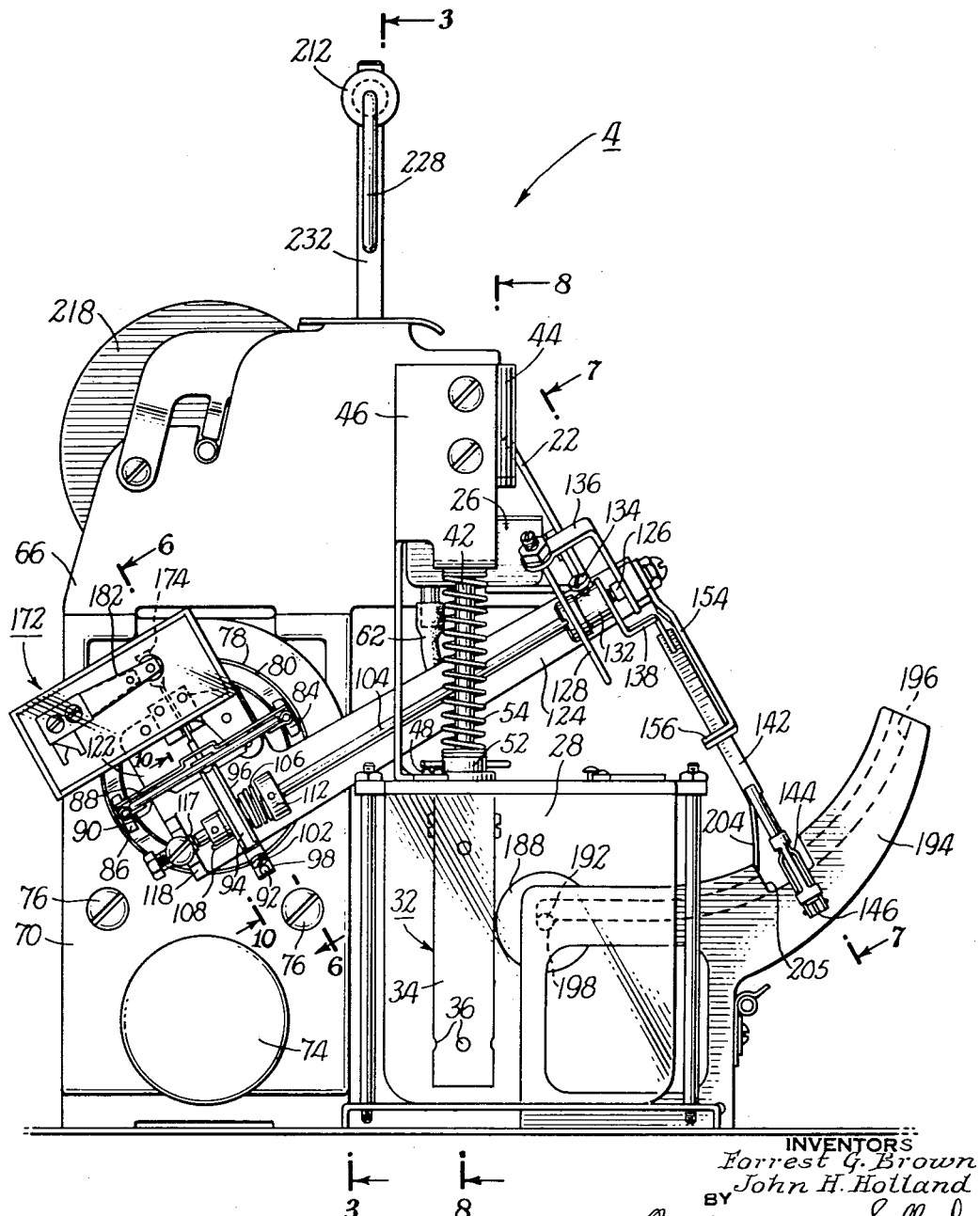
Figure 2 is an end view of the receiver portion of the transceiver with the case removed.

As best shown in Figure 2, the shaft 104 is rotatably mounted at its lower end in a bearing 117 supported by an arm 118 of a bracket 122, of non-magnetic material, secured to the end face of the bar magnet 64. This bracket 122 is provided also with a forwardly-extending arm 124 which supports a pivotal bearing 126 for the forward end of shaft 104.

A spiral spring 128 (best shown in Figure 7), which is substantially heavier than the spring 106, biases the shaft 104 for rotation in a clockwise direction as viewed in this figure. This spring is secured at its inner end to a collar 132 (Figure 2) which is fastened to the shaft 104 by a set screw 134, and at a point near its outer end to an L-shaped arm 136 which is supported by the bracket arm 124.

In order to link the shaft 104 with the pen 16, an arm 138, which is rigidly secured to and extends outwardly from the collar 132, engages the end of a flat spring member 142 which is hinged by a forked member 144 to a shorter flat spring member 146, whose widest dimension lies in a plane perpendicular to the widest dimension of the spring 142. The shorter spring member 146 is connected through the pen-linkage arm 150 and a pivotal joint 152 to the "right" pen linkage arm 150R that supports the pen 16, and which is linked to a second pen-actuating mechanism positioned on the opposite side of the receiving apparatus and which is generally similar in structure to the linkage mechanism just described, similar parts being referred to by similar numbers followed by the suffix "R" to indicate that they are corresponding right-hand members.

As shown in Figure 6, the right hand bucket assembly includes a right bucket winding 80R supported by a frame 82R which is connected to a ball chain 92R by a yoke arrangement substantially identical with that already described. It will be noted that in the normal resting position of the pen 16, that is with the pen positioned in the inkwell 20, that the left-hand bucket 80 is positioned at its innermost position, toward the center of the bar magnet 64, while the right-hand bucket 80R is positioned at its outermost position, near the outer end of the bar magnet 64.

The ball chain 92R is secured to the cam 96R, in the manner described above, but the cam 96R, on the right-hand side of the machine, is keyed directly to the pen-operating drive shaft 104R. The supporting structure for the shaft 104R and the spiral biasing spring 128R (Figures 2 and 7) are arranged in a manner substantially identical with that already described. The shaft 104R is connected to the pen 16 through a flat spring member 142R which is connected by a hinge to the shorter flat spring member 146R, which is, in turn, connected to the pen 16 through the rod 150R.

Fixed arms 154 and 154R are provided to limit the movement of the pen-supporting linkage so that when no signals are being received by the buckets 20 and 80R, the pen 16 will rest in inkwell 20. The arm 154 is secured to the bracket arm 124 and is provided with an overhanging end portion 156 against which the spring member 142 abuts to limit the clockwise rotation of the shaft 104. On the right-hand side of the machine, the corresponding arm 154R is supported by the bracket arm 124R and limits the clockwise rotation of the shaft 104R.

In order to reduce the friction of the pen driving arrangement, it has been customary to apply a pulsating voltage to the lines feeding the buckets 80 and 80R. This voltage, which may be a 120 cycle signal, produces a continuous tremor or shaking of the buckets 80 and 80R and the pen linkage system, thus reducing the static friction of the system. However, it has been found that improved results can be obtained by feeding the pulsating or "shake" voltage directly into the buckets and using a much larger value of shake voltage than has heretofore been used. For example, previous machines have used a shake voltage of approximately two volts across each of the buckets 80 and 80R, whereas in the present receiver approximately nineteen volts of shake signal is impressed across each bucket. This magnitude of shake voltage would cause the pen 16 to trace an irregular line with the linkage arrangement formerly in use. Accordingly, a simplified and highly efficient mechanical filtering action has been obtained by the use of the flat spring members 142 and 142R as linkage elements of the stylus driving arrangement. The resiliency of these arms is adjusted, with consideration for the inertia of the linkage system, so as to substantially damp out the 120-cycle frequency so that the line traced by the pen 16 is not objectionably irregular, but the frictional drag of the pen-driving system is reduced materially. The circuits for the application and isolation of the shake voltages will be described later.

*Pen-lifting arrangement*

In order to lift the pen 16 from the paper strip 18, so that a discontinuous trace can be received, two parallel-connected electromagnets 156 are positioned beneath the receiver platen 22 (Figures 5 and 7) and are so arranged that when energized they lift the recording pen 16 from the paper 18. A movable armature assembly comprises two pivotally mounted armature-supporting arms 158 connected by a magnetizable armature 162 that extends across the face of the electromagnets 156. The armature 162 supports a cross-member 164, each end of which is connected by a rod 166 to a pen-lifter bar 168.

When the magnets 156 are energized, the armature 162 is pulled forwardly and upwardly moving the rods 166 longitudinally and lifting the pen-lifter bar 168 away from the platen 22. The pen-lifter bar 168 strikes the pen linkage members 150 and 150R and lifts the recording pen 16 from the surface of the paper 18, this movement of the pen linkage members being permitted by the spring members 146 and 146R. The operation of these pen-lifter magnets is controlled by the under-platen switch, which as mentioned above is positioned beneath the writing platen 14.

*Left-lever turn-on switch (Figures 2, 6, and 9)*

In some installations, where the various transmitters and receivers are located near each other, it is not difficult to connect the various machines with as many wires as is desired. However, when the transmitter and receiver are located at a considerable distance, it is important to eliminate as many of the connecting wires as possible. For example, when telephone circuits are employed for the transmission of graphic characters, it is desirable that not more than two lines be required between the transmitter and receiver. However, there are several functions which must be performed by these two wires. For example, separate writing signals must be transmitted for the left and right hand buckets, the signal must be provided for lifting the pen from the paper so that a discontinuous trace can be transmitted, and another signal must be provided for shifting the paper at the receiver. In addition to the above functions, it is desirable to provide a signaling arrangement so that the operator at a transmitter can signal to the operator at one or more receivers that a message is about to be transmitted. Moreover, in systems employing several transmitters and receivers, an interlock system must be provided which will prevent two transmitted signals being received simultaneously on the same receiver, for this would destroy both message and perhaps damage the receiving equipment.

*Paper-shifting arrangement (Figures 1 to 5 and 11)*

The roll of paper 18, on which the messages are to be written by the recording pen 16, is mounted on a reel 188 which is rotatably supported by a shaft 192 the ends of which are supported by two upwardly-extending brackets 194 (Figure 2). Each of the brackets 194 (only one of which is shown in the drawings) is provided with an arcuate groove 196, having a bearing portion 198 adapted to receive one end of the shaft 192. This roll of supply paper may be inserted in the receiver by opening a hinged cover plate 202 in the case 6 (Figure 1) and swinging downwardly a pivotally mounted shield 204 (Figure 5) and sliding the ends of shaft 192 of the reel 188 downwardly along the arcuate grooves 196. The brackets 194 are provided with cut-out portions as shown at 205 in Figure 2 to permit passage of the pen-driving linkage members.

The paper strip 18 extends from the front of reel 188 upwardly over the upper surface of the writing platen 22 (Figure 5) between a friction drive roller 206 and a pressure roller 208, thence over an idler roller 212, and downwardly around a second idler roller 216 to a takeup reel 218.

The paper-handling mechanism is supported by the two upright frame members 66 and 68 which support the drive and idler rollers and the platen assembly. The pressure roller 208 is supported by a shaft 222 (Figure 4) which extends from each end of the roller 208 and is positioned in recesses 224 in the frame members 66 and 68 and is maintained in firm pressure against the surface of drive roller 206 by means of two tension springs 226 secured at one end to the shaft 222 and at their opposite ends to frame members 66 and 68, respectively.

As best shown in Figure 3, the idler roller 212 is rotatably mounted on a triangular wire framework 228 supported from an upright post 232. This idler roller causes the paper to pass upwardly above the surface of the case 6, so that the messages most recently received are visible from the front of the receiver. The post 232 is adjustably positioned in a channel 234 supported by the frame member 68. One surface of the post 232 is provided with spaced horizontal grooves as at 236 into which is adapted to fit an inwardly projecting portion 238 of a leaf spring 242 secured to the channel 234 to form a detent so that the post 232 can be adjusted to and locked at any one of several heights. With the post 232 in its uppermost position, a considerable number of messages will remain visible, but for applications where it is not necessary to observe more than one or two earlier messages, the post 232 can be placed in one of the lower positions.

A cam 262 (Figure 4) having a notch 264 is secured to the other end of the paper drive roller 206, adjacent which is positioned a follower-arm or a pawl 266 that is controlled by a solenoid 268. The pawl 266 is pivotally supported at 272 and is secured at its other end to an armature 274 of the solenoid 268. A shoulder 276 on the solenoid-controlled pawl 266 stops the rotation of the paper feed roller 206 at the position indicated, whenever the solenoid is not energized, the pawl being urged toward the locking position by a wire spring 278. A switch 282, forming part of the paper-shifting control circuits, is operated by the pawl 266. This switch, the solenoid 268, the switch 258, and the electric drive motor 252, are all connected into the paper-shifting circuit which will be described later.

The take-up reel 218 is driven by an electric motor 284 (shown only in the circuit diagrams in Figure 11), which is connected to operate simultaneously with the paper-shifter motor 252, and is provided with a friction drive clutch (not shown) which permits the take-up reel to keep the paper strip 18 under constant tension without over-loading the motor 284 or tearing the paper. A manually operable switch 286 (Figure 1), extending from the top of the case 6 is provided so that the take-up reel can be driven separately from the paper-shifter motor when desired.

The recording platen (Figure 7)

The recording pen 16 is lifted by the bar 168 from the surface of the paper strip 18 when the writing stylus 8 is lifted from the writing platen 14, and is dropped upon the writing surface when pressure is again exerted on the transmitter platen 14. The surface of the recording platen 22, therefore, must be such as to prevent the pen from bouncing and causing an incomplete or irregular line when the pen is dropped onto the surface of the paper on which the message is being recorded. For example, if the platen were formed of metal, the pen would bounce when it struck the surface of the paper and cause a broken or incomplete line. To overcome this, the platen has ordinarily heretofore been formed with a central opening over which the paper is stretched so that the resiliency of the paper damps out any bouncing tendency of the recording pen 16. A light placed behind this opening will provide a light for the writing surface, but it will not provide any guide lines or other indicia to assist the operator in writing the message. Such guides lines or indicia could be provided by a projection system, but such systems are expensive and to provide the parallel rays necessary to prevent parallax would require more space than is available in a commercial machine. In the present machine, this problem has been solved by making the recording platen 22 from a thin resilient sheet having energy absorption characteristics. A thin sheet of plastic has been found to absorb the energy from the pen 16 as it strikes the surface and to eliminate bouncing. The plastic sheet which forms the platen 22 may be translucent and has a black coating adjacent the paper 18. Guide lines 288, for directing the writing movements of the operator during transmission, may be engraved in the opaque coating of this thin plastic platen 22 and permit the light from lamps 292, positioned behind the platen 22, to shine through, or opaque lines may be inscribed on the uncoated translucent plastic. These marks are formed on the surface of the plastic adjacent the paper sheet so that it is not necessary to utilize a parallel beam light source in order to prevent parallax. It is understood, of course, that other indicia or forms of guide marks can be engraved on the platen in accordance with the particular application of the machine. The lamps 292 are energized with direct current in order to eliminate vibration of the filaments which would be produced because of the stray magnetic field surrounding the lamps if alternating current were used.

The electrical circuits (Figure 12)

The electrical circuits include not only an arrangement for transmitting the graphic characters from the local transmitter to the distant transmitter, but also provide for the signaling between the transmitter and the various receivers and for shifting the paper at the receivers. An interlock system is provided to prevent interference between the transmitter and the receiver. It is to be understood, of course, that the particular signaling and interlock arrangement which is to be used will depend upon how many transmitters and receivers are being used and the operating arrangement desired between them. Accordingly, a typical system has been shown in the drawings and one in which only two lines extend between the local transceiver and the distant station. Only the circuits of the transceiver are shown because the receiver portion of the local transceiver is identical with the distant receiver.

The various relays and switches throughout the circuit are shown in the position which they occupy during the time writing is being transmitted from the local transmitter to a distant station.

The writing circuits

As shown in Figure 12, the transmitter and local receiver are operated by alternating current from conventional supply lines 300 and 302. The line 300 of the A.-C. power mains is connected through an armature 304 and a fixed contact 306 of a unison relay, generally indicated at 308, to a transmitter power supply, indicated in block form at 312, which includes the usual transformers, rectifiers, and voltage regulator circuits, and which is connected directly to the supply line 302. The unison relay is controlled by a unison switch 314. This switch is positioned adjacent the transmitter platen 14 and is operated by pressing a control button (not shown) with the tip of the transmitter stylus 8. This switch is ratchet-controlled so that successive actuations of the control button alternately open and close the switch contacts. The switch is arranged so that it can be operated only by the stylus 8, substantially as described in connection with the unison switch in the above-mentioned Lauder et al. patent.

The negative output terminal 316 of the power supply 312 may be connected as indicated to a common ground circuit, which is used also as the return circuit between the local and distant stations.

The positive output terminal 318 of the power supply 312 is connected to the actuating winding 322 of a master relay, which controls a number of switches indicated at their respective places in the drawings as MS–1, MS–2, etc. During the time that graphic characters are being transmitted, that is, when the unison switch 314 is closed, this winding 322 is energized and accordingly the "MS" switches operated thereby are shown in the positions which they assume when this winding is energized.

The voltage from this power supply is applied also across "left" and "right" potentiometers, indicated at 324 and 326, respectively, the movable contacts 328 and 332 of which are controlled by the movement of the writing stylus 8. The stylus linkage mechanism of the transmitter and the potentiometers 324 and 326 are substantially as described in U. S. Patent 1,770,761 to Tiffany.

The movable contact 328 of the "left" potentiometer 324 is connectced through a protecting fuse 334 and an isolation choke 336 to a fixed contact 338 on a switch MS–1, operated by the master relay winding 322, the armature 342 of which is connected to a transmission line 344 leading to the distant receiver, and which is called the "left" line.

The movable contact 332 of the "right" potentiometer 326 is connected through a protective fuse 346 and an isolating choke 348 to a fixed contact 352 of a switch MS–2, also operated by the master winding 322, the armature 354 of which is connected to a fixed contact 356 of a switch TS–1, which is operated by a transfer relay winding 358 that is energized whenever graphic characters are being transmitted or received; the energizing circuits for this transfer relay will be described later. The armature 362 of switch TS–1 is connected to the "right" line 364 which leads to the distant receiver.

Thus, when the graphic characters are being transmitted, the variable D.-C. voltages produced by the "left" and "right" stylus-controlled potentiometers 324 and 326 are connected directly to the "left" and "right" lines 344 and 364 for transmission to the distant receiver.

Because the "left" and "right" lines may be connected at the distant station to the transceiver identical with that represented by Figure 12, the action at the distant receiving end may be explained by assuming that signals are being received locally on the "left" and "right" lines and that all of the various switches have been changed to the receiving position, as will be described later.

During transmission, the local receiver is utilized as a monitor so that the operator can see the characters on the local receiver exactly as they are being reproduced at the distant station. Thus, the signal from the stylus-controlled contact 328 of the "left" potentiometer 324 is connected also from the "left" line 344 through a resistor 366, which may have a value of 1200 ohms, a lead 368, and an isolation choke 372 to one terminal of the "left" bucket 80 of the local receiver. The other terminal of this bucket is connected to the common ground circuit.

The signal from the "right" stylus-controlled potentiometer contact 332 is connected through a resistor 374, having a value equal to the resistor 366 in the other side of the line, and an isolation choke 376, to one terminal of the "right" bucket 80R of the local receiver. The other terminal of this bucket is connected to the common ground circuit. Thus, the stylus-generated voltages are applied also to the two buckets of the local receiver and control the movement of the recording pen 16, as described above.

*The pen-lifter circuit*

In order to operate the pen-lifter circuits at the receiver, an oscillator, indicated in block form at 418, energized by power from the transmitter power supply 312, generates a 200-cycle signal which is applied from two output terminals 422 and 424 to the "left" and "right" lines through blocking condensers (not shown). The output signal from this oscillator is controlled by the under-platen switch 426, similar to that described in the above-mentioned patent to Lauder et al. This under-platen switch is responsive to pressure of the stylus 8 on the platen 14 and is arranged so that the oscillator 418 delivers a 200-cycle signal when the stylus 8 is pressing down on the platen 14, and prevents the delivery of the 200-cycle signal when the stylus is lifted from the platen. At the local and distant receivers, the recording pens are lifted from the writing surface whenever the 200-cycle signal is absent.

The operation of the pen-lifter circuit can be considered by assuming that a writing signal is being received by the local receiver, either from a distant station or from the local transmitter. When the writing signal is being received from a distant station, the operating circuit for the 200-cycle pen-lifter signal, which is present on the "left" and "right" lines, can be traced from the "left" line 344 through the armature 342 and a fixed contact 428 of the switch MS–1 (which is now in the other position from that shown in the drawing), armature 429 and fixed contact 430 of switch MS–3, the operating coils 434 of a vibratory relay, diagrammatically and generally indicated at 436, a condenser 438, and a fixed contact 442 and the armature 354 of the switch MS–2 to the "right" line 364. When the 200-cycle signal is being generated by the local transmitter, the circuit can be traced from terminal 422 of the signal generator 418 through the contact 388 and armature 342 of switch MS–1, the resistor 366, a resistor 443, operating coils 434, condenser 438, the resistor 374 and armature 354 and contact 352 of switch MS–2 to the other terminal 424 of the signal generator 418. This vibratory relay 436 causes continuous vibration of a contact member 444, connected between a pen-lifter control lead 446 and ground, in such manner that this circuit is completed for a very small percentage of the time. Whenever the 200-cycle signal is interrupted the pen-lifter circuit is completed through the member 444. Such a relay is described by Van Nostrand in U. S. Patent 1,817,468.

The energizing circuit for the pen-lifter mechanism can be traced from ground through vibratory member 444, lead 446, a contact 448, and an armature 452 of a transfer relay switch TS–2, energizing windings 454 of the pen-lifter magnets 156 (shown in Figure 5), a fixed resistor 456, a fixed contact 458 and an armature 462 of a switch LT–1, forming part of the left-lever turn-on switch 172, to the positive terminal 408 of the receiver power supply 382. A half-wave rectifier 464 is connected across the terminals of the pen-lifter windings 454 and suppresses arcing that would otherwise occur when the circuit is opened.

When the 200-cycle pen-lifter signal is present the vibrating member 444 does not permit enough average current to flow to energize the pen-lifter magnet windings 454, but when this signal is interrupted, the vibratory member 444 completes the circuit from the positive terminal 408 of the receiver power supply through the pen-lifter coils 454 to ground and energization of the windings 454 of the magnets 156 lifts the pen 16 from the surface of the paper 18.

*The platen light circuit*

Whenever the receiver is receiving a message, the paper-shifter relay winding 388 is energized and completes the platen-lighting circuit from A.-C. line 300 through the armature 506 and contact 508 of the paper-shifter relay switch PS–2, a half-wave rectifier 562, a filter resistor 564, and the parallel-connected platen-illuminating lamps 292 to the other A.-C. line 302. A high-capacity low-voltage filter condenser 566 is connected in parallel with the lamps 292.

From the foregoing, it will be observed that the telescriber embodying the invention is well adapted for the attainment of the ends and objects hereinbefore set forth and to be economically manufactured, the separate features being readily suited to common production methods. It is apparent that the various features may be modified in order to adapt the telescriber to particular use and that one or more of the features may be used without a corresponding use of other features, and the foregoing example is given for the purpose of illustrating a preferred embodiment of the invention and not for purposes of limitation except as set forth in the following claims or required by the prior art.

What is claimed is:

1. In a telescriber system for the transmission of graphic characters from one location to another, receiving apparatus adapted for use in monitoring the output of a telescribed transmitter unit comprising, a recording pen, a strip of translucent paper, first and second linkage mechanisms arranged to move said pen over the surface of said paper in accordance with the graphic characters to be reproduced, a pen-lifter bar arranged to lift said pen from said paper and to release said pen and allow it to drop on said paper to permit transcribing discontinuous traces, a thin resilient translucent platen supporting said paper beneath said pen, the resiliency of the platen being such as to minimize bouncing of said pen when it is dropped on said paper, said platen having guide indicia defined thereon by differential light transmission characteristics, and illuminating means behind said platen whereby said indicia are rendered visible through said paper.

2. In a telescriber system for the transmission of graphic characters from one location to another, receiving apparatus adapted for use in monitoring the output of a telescriber transmitter unit comprising, a recording pen, a strip of translucent paper, first and second linkage mechanisms arranged to move said pen over the surface of said paper in accordance with the graphic characters to be reproduced, a pen-lifter bar arranged to lift said pen from said paper and to release said pen and allow it to drop on said paper to permit transcribing discontinuous traces, a thin resilient translucent platen supporting said paper beneath said pen, the resiliency of the platen being such as to minimize bouncing of said pen when it is dropped on said paper, said platen having an opaque coating with guide line indicia engraved therethrough, and illuminating means behind said platen whereby said indicia are rendered visible by light transmitted through said platen.

3. In a telescriber system for the transmission of graphic characters from one location to another, receiving apparatus adapted for use in monitoring the output of a telescriber transmitter unit comprising, a recording pen, a strip of translucent paper, first and second linkage mechanisms arranged to move said pen over the surface of said paper in accordance with the graphic characters to be reproduced, a pen-lifter bar arranged to lift said pen from said paper and to release said pen and allow it to drop on said paper to permit transcribing discontinuous traces, a thin resilient translucent platen supporting said paper beneath said pen, the resiliency of the platen being such as to minimize bouncing of said pen when it is dropped on said paper, said platen having guide line indicia inscribed on the surface thereof adjacent said paper so that parallax is avoided when said indicia are viewed through the paper, and illuminating means behind said platen whereby said indicia are rendered visible through said paper.

4. In a telescriber system in which graphic written characters traced at a transmitter station are simultaneously reproduced at a receiver station, transmitter apparatus comprising, in combination, a manually-operable stylus for tracing graphic written characters, signal producing means associated with said stylus for developing output signals in accordance with the characters being traced thereby, a transmission channel for transmitting said signals to said receiver, and a monitoring device forming an integral part of said transmitter apparatus adjacent said stylus and arranged to produce a representation of the graphic characters traced by said stylus for viewing by the transmitter operator, said device including a recording member, a strip of translucent recording material positioned next to said recording member, driving means responsive to said output signals for moving said recording member over said material, lifting means arranged to lift said recording member from said material and to release said recording member and allow it to drop on said material to permit transcribing discontinuous traces, a thin translucent platen supporting said material beneath said recording member, means for moving said material in predetermined increments over said platen, at least three guide lines marked on said platen, and electric illuminating means positioned behind said platen whereby said guide lines are rendered visible through said recording material, said guide lines extending horizontally and parallel to one another substantially the full width of said platen, said guide lines further being evenly spaced-apart and subdividing essentially the entire platen and the recording material thereover into separate rows within which graphic characters may be transcribed by said recording member.

5. In a telescriber system in which graphic written characters traced at a transmitter station are simultaneously reproduced at a remotely-located receiver station, transmitter apparatus comprising, in combination, a manually-operable stylus for tracing graphic written characters, signal producing means associated with said stylus for developing output signals in accordance with the characters being traced thereby, a transmission channel for transmitting said signals to said receiver, and a monitoring device forming an integral part of said transmitter apparatus adjacent said stylus and arranged to produce a representation of the graphic characters traced by said stylus for viewing by the transmitter operator, said device including a recording pen, a strip of translucent paper positioned next to said recording pen, driving means responsive to said output signals, first and second linkage mechanisms under the control of said driving means and arranged to move said pen over the surface of said paper in accordance with the graphic characters to be reproduced, a pen-lifter bar arranged to lift said pen from said paper and to release said pen and allow it to drop on said paper to permit transcribing discontinuous traces, a thin translucent platen supporting said paper and said pen, a paper-shifter mechanism for moving said paper in predetermined increments through said monitoring device, said platen having at least three parallel spaced-apart guide line indicia marked thereon, and an electric lamp behind said platen whereby said indicia are rendered visible through said paper, said guide lines extending horizontally substantially the entire width of said platen and sub-dividing said platen and the paper thereover into a plurality of adjacent rows within which graphic characters may be transcribed by said pen.

References Cited in the file of this patent

UNITED STATES PATENTS

| Number | Name | Date |
|---|---|---|
| 2,156,289 | Hoy | May 2, 1939 |
| 2,186,897 | D'Humy et al. | Jan. 9, 1940 |
| 2,187,574 | Nigra | Jan. 16, 1940 |
| 2,355,398 | Schoonenberg et al. | Aug. 8, 1944 |
| 2,462,904 | Rosen | Mar. 1, 1949 |